(12) United States Patent
Oberpriller et al.

(10) Patent No.: US 10,726,222 B2
(45) Date of Patent: Jul. 28, 2020

(54) APPARATUSES AND SYSTEMS FOR ATTACHING MODULES ON A MOBILE SCANNING DEVICE

(71) Applicant: Hand Held Products, Inc., Fort Mill, SC (US)

(72) Inventors: Mark Lee Oberpriller, Atlanta, GA (US); Hui Li, Jiangsu (CN); Robert Bruffey, Lawrenceville, GA (US); Glenn David Aspenns, Cincinnati, OH (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 16/261,950

(22) Filed: Jan. 30, 2019

(65) Prior Publication Data
US 2019/0251310 A1   Aug. 15, 2019

(30) Foreign Application Priority Data
Feb. 12, 2018   (CN) ...................... 2018 2 0251726 U

(51) Int. Cl.
*G06K 5/00*  (2006.01)
*G06K 7/10*  (2006.01)
*G06K 7/14*  (2006.01)

(52) U.S. Cl.
CPC ..... *G06K 7/10386* (2013.01); *G06K 7/10881* (2013.01); *G06K 7/1413* (2013.01); *G06K 2007/10524* (2013.01)

(58) Field of Classification Search
CPC ..... G06K 2007/10524; G06K 7/10386; G06K 7/10881; G06K 7/1413
See application file for complete search history.

(56) References Cited

U.S. PATENT DOCUMENTS

| | | | | |
|---|---|---|---|---|
| 7,074,205 B1* | 7/2006 | Duffy | ................. | A61M 5/1413 604/65 |
| 7,296,825 B1* | 11/2007 | Zia | ......................... | B60R 22/48 180/268 |
| 2011/0049243 A1* | 3/2011 | Gong | ................. | G06K 7/10851 235/462.48 |
| 2011/0116747 A1* | 5/2011 | Terlizzi | ................ | G02B 6/3817 385/75 |
| 2012/0169198 A1* | 7/2012 | Jiang | ...................... | G06F 1/183 312/333 |

OTHER PUBLICATIONS

Office Action for Chinese Application No. 201820251726.6 dated Jul. 27, 2018, 2 pages.

* cited by examiner

*Primary Examiner* — Thien M Le

(74) *Attorney, Agent, or Firm* — Alston & Bird LLP

(57) ABSTRACT

Various embodiments illustrated herein disclose a latching mechanism that enables engagement of modules on a mobile scanning device. The latching mechanism includes a release switch that translates between a first position and a second position. The release switch is coupled to a latch body that includes a first tongue section and a second tongue section. The first tongue section engages with the mobile scanning device, while the second tongue section engages with an attachment member. When the release switch is moved to a first position, the mobile scanning device is disengaged. When the release switch is moved to the second position, the attachment member is disengaged.

20 Claims, 17 Drawing Sheets

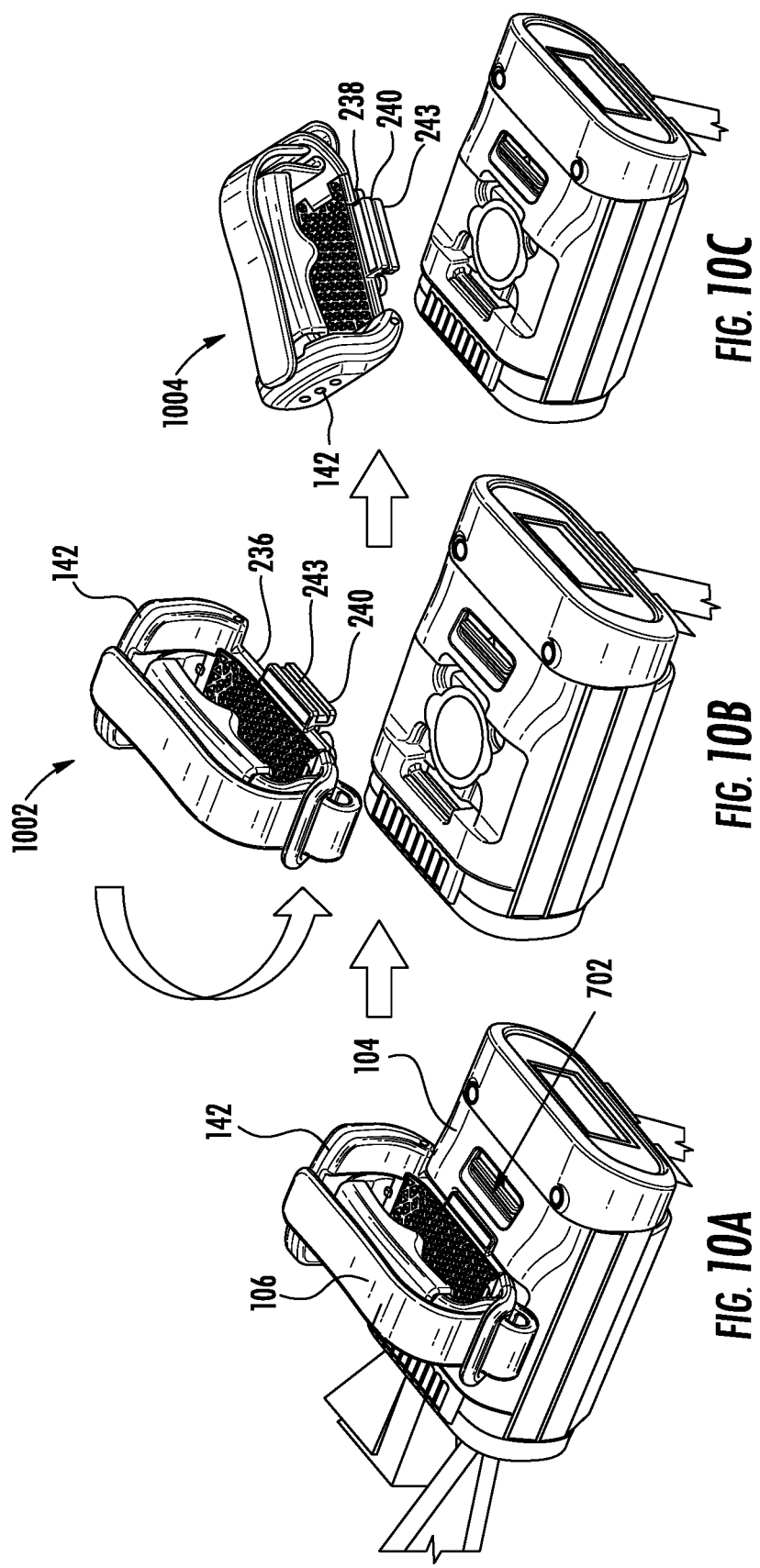

APPARATUSES AND SYSTEMS FOR ATTACHING MODULES ON A MOBILE SCANNING DEVICE

CROSS-REFERENCE TO RELATED APPLICATIONS

The present invention claims priority to and benefit of Chinese Utility Model Application No. 201820251726.6, filed with the State Intellectual Property Office (SIPO) of the People's Republic of China on Feb. 12, 2018, the entire content of which is incorporated by reference into the present application.

TECHNOLOGICAL FIELD

Example embodiments of the present disclosure relate generally to a mobile scanning device and, more particularly, to systems and apparatuses for attaching various modules on the mobile scanning device.

BACKGROUND

A typical mobile scanning device may be utilized in work environments (such as, but not limited to, retail outlets and warehouses) to scan/capture images of the objects. Such images may be processed/decoded to extract the information pertaining to the objects, which may be further utilized to perform various operation in the work environment (such as, but not limited to, maintaining a record/repository of the objects available in the work environment).

Workers utilizing these mobile scanners often have to move around in the work environment to scan/capture images of the objects. The mobile scanning devices are handheld and occupy one of the hands of the worker. Hence, the worker is left with only a single hand to perform other operations, such as holding an object to be scanned. Such a scenario may lead to accident situations, and may compromise the overall efficiency of the worker operating in the work environment.

Applicant has identified a number of deficiencies and problems associated with conventional mobile scanners, and other associated systems and methods described herein. Through applied effort, ingenuity, and innovation, many of these identified problems have been solved by developing solutions that are included in embodiments of the present disclosure, many examples of which are described in detail herein.

BRIEF SUMMARY

In accordance with various illustrated embodiments, a latching mechanism includes a release switch configured to translate between a first position and a second position. Further, the latching mechanism includes a latch body attached to the release switch and configured to translate between the first position and the second position. The latch body defines a first tongue section configured to engage a corresponding first receiving element of a first device. Further, the latch body defines a second tongue section configured to engage a corresponding second receiving element of a second device. In an instance in which an external force is applied to the release switch in a first direction, the latch body translates in the first direction to the first position such that: engagement between the second tongue section and the corresponding second receiving element is disengaged. The second device is removable from the latching mechanism. Further, the engagement between the first tongue section and the corresponding first receiving element is maintained. In an instance, in which an external force is applied to the release switch in a second direction, the latch body translates in the second direction to the second position such that: engagement between the first tongue section and the corresponding first receiving element is disengaged. The first device is removable from the latching mechanism. Further, the engagement between the second tongue section and the corresponding second receiving element is maintained.

In accordance with various illustrated embodiments, an adapter module includes a housing defining a bottom surface configured to receive a mobile scanning device. Further, the housing includes a top surface side configured to receive an attachment member. The adapter module includes a latching mechanism that further includes a release switch configured to translate between a first position and a second position. Further, the latching mechanism includes a latch body attached to the release switch and configured to translate between the first position and the second position. The latch body defines a first tongue section configured to engage a corresponding first receiving element of a mobile scanning device. Further, the latch body defines a second tongue section configured to engage a corresponding second receiving element of an attachment member. In an instance in which an external force is applied to the release switch in a first direction, the latch body translates in the first direction to the first position such that: engagement between the second tongue section and the corresponding second receiving element is disengaged. The attachment member is removable from the latching mechanism. Further, the engagement between the first tongue section and the corresponding first receiving element is maintained. In an instance, in which an external force is applied to the release switch in a second direction, the latch body translates in the second direction to the second position such that: engagement between the first tongue section and the corresponding first receiving element is disengaged. The mobile scanning device is removable from the latching mechanism. Further, the engagement between the second tongue section and the corresponding second receiving element is maintained.

BRIEF DESCRIPTION OF THE DRAWINGS

Figure 1:
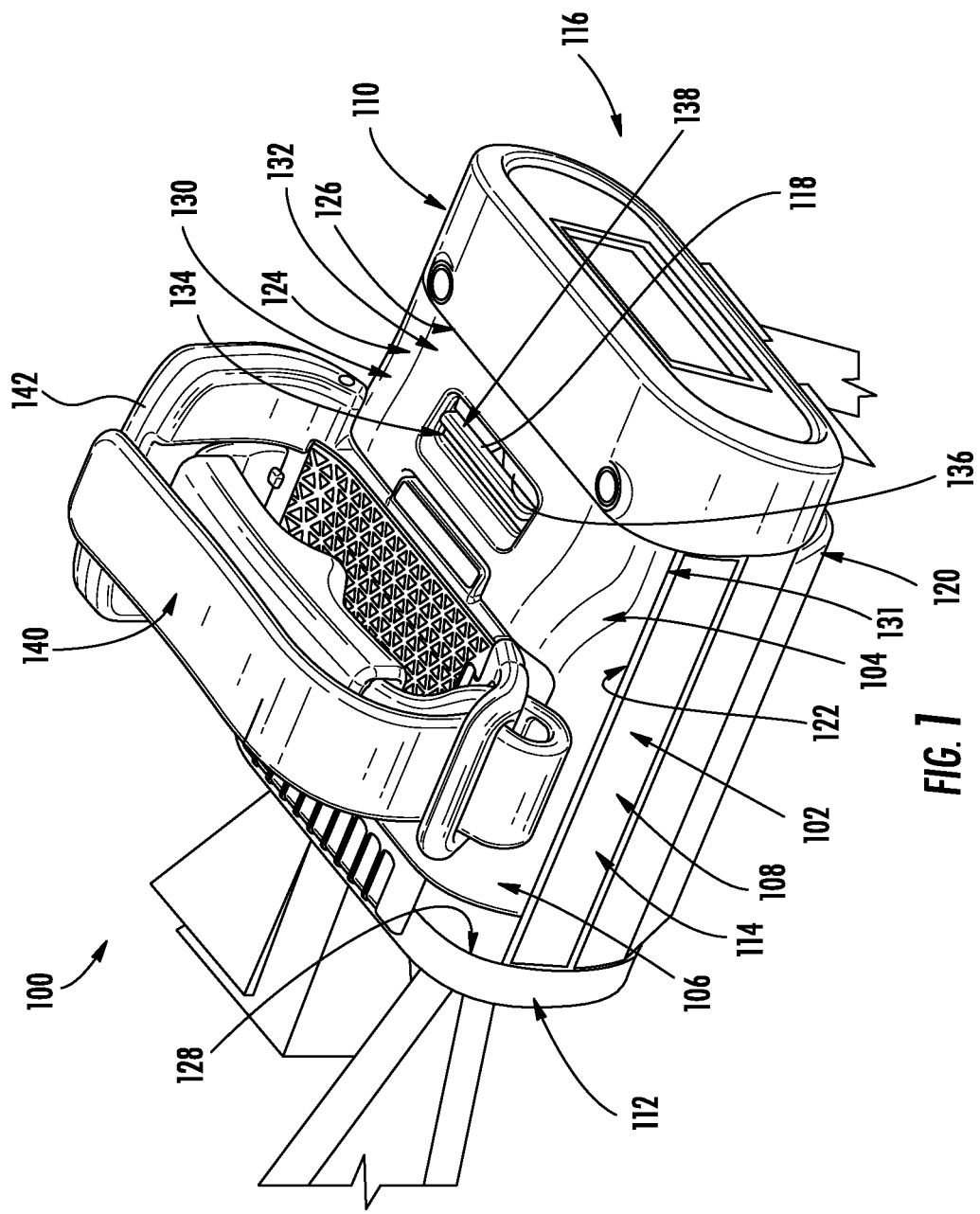
Figure 2A:
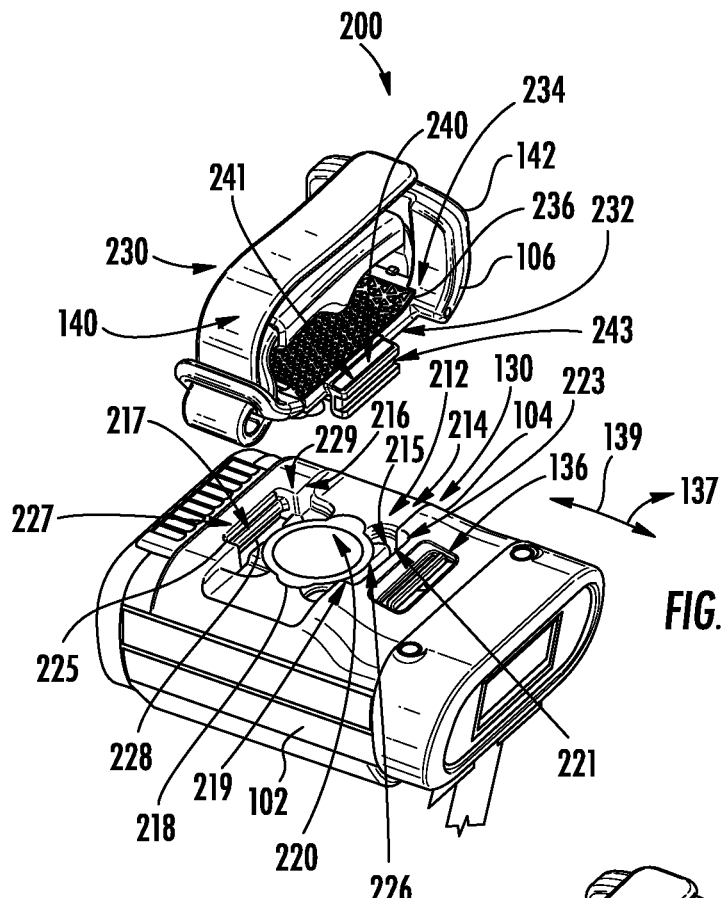
Figure 2B:
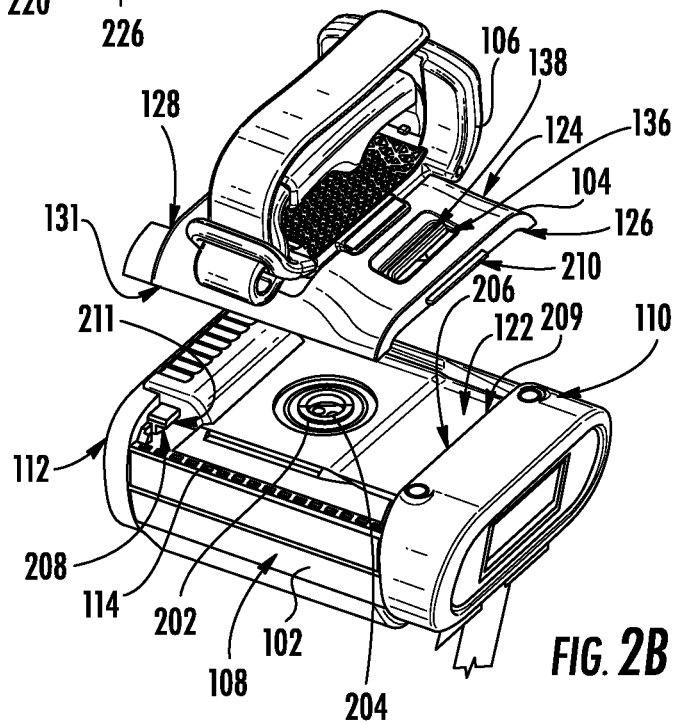
Figure 3:
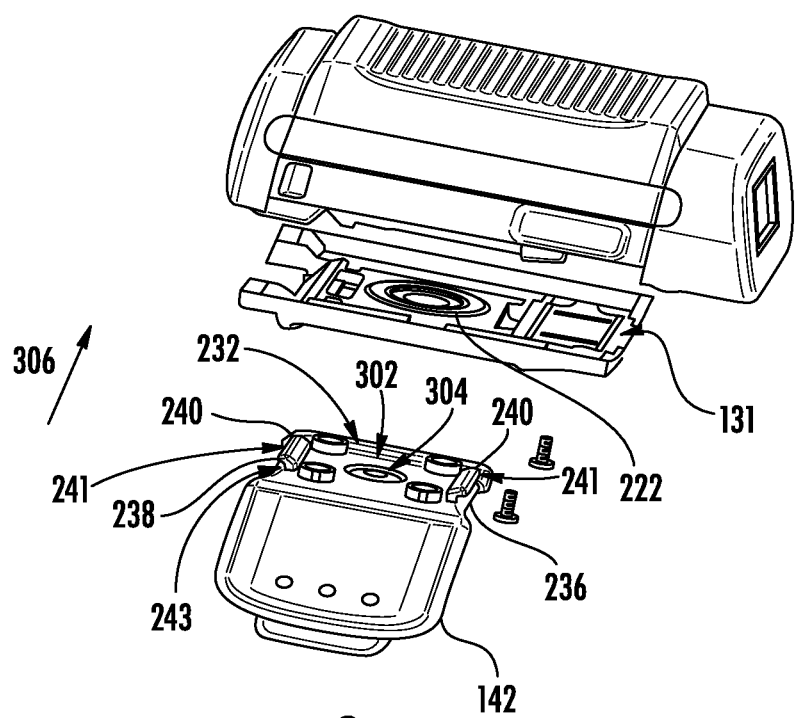
Figure 4:
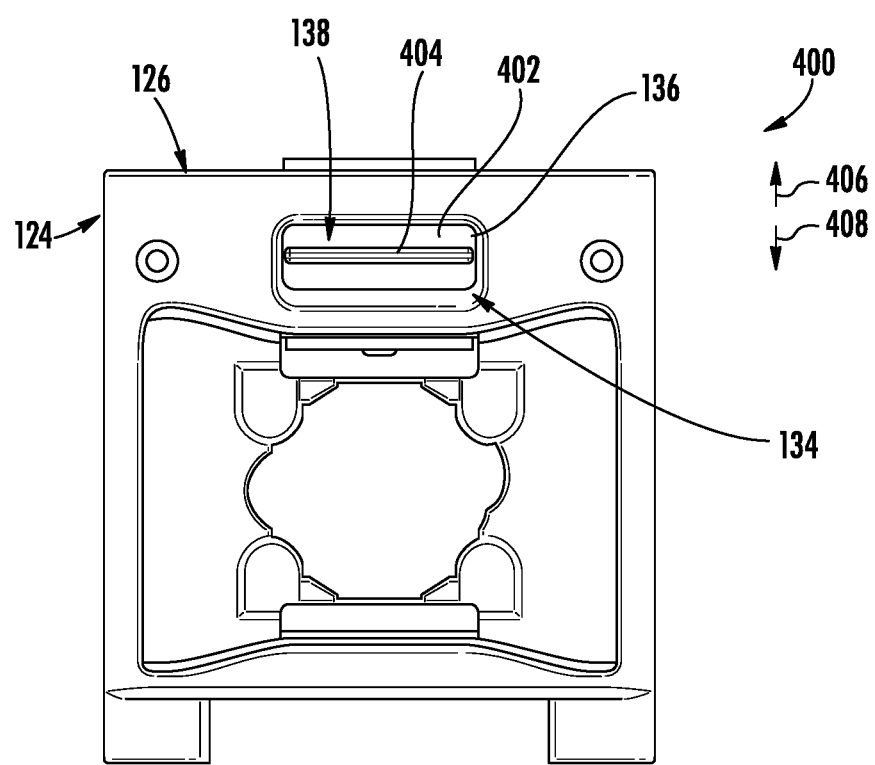
Figure 5:
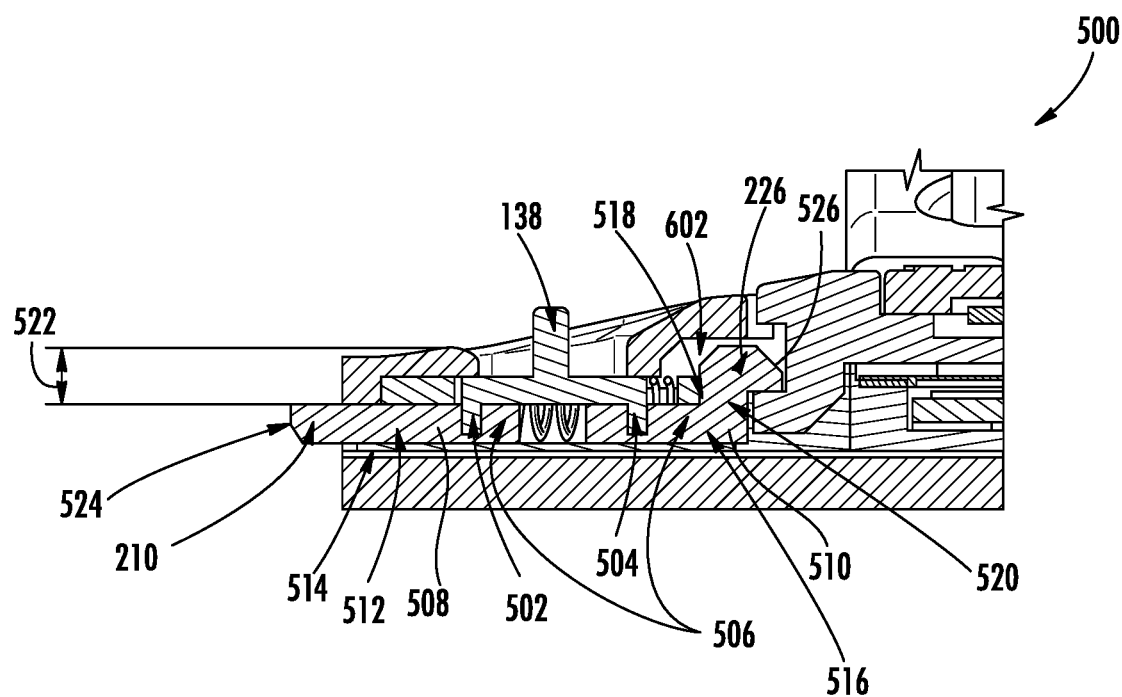
Figure 6:
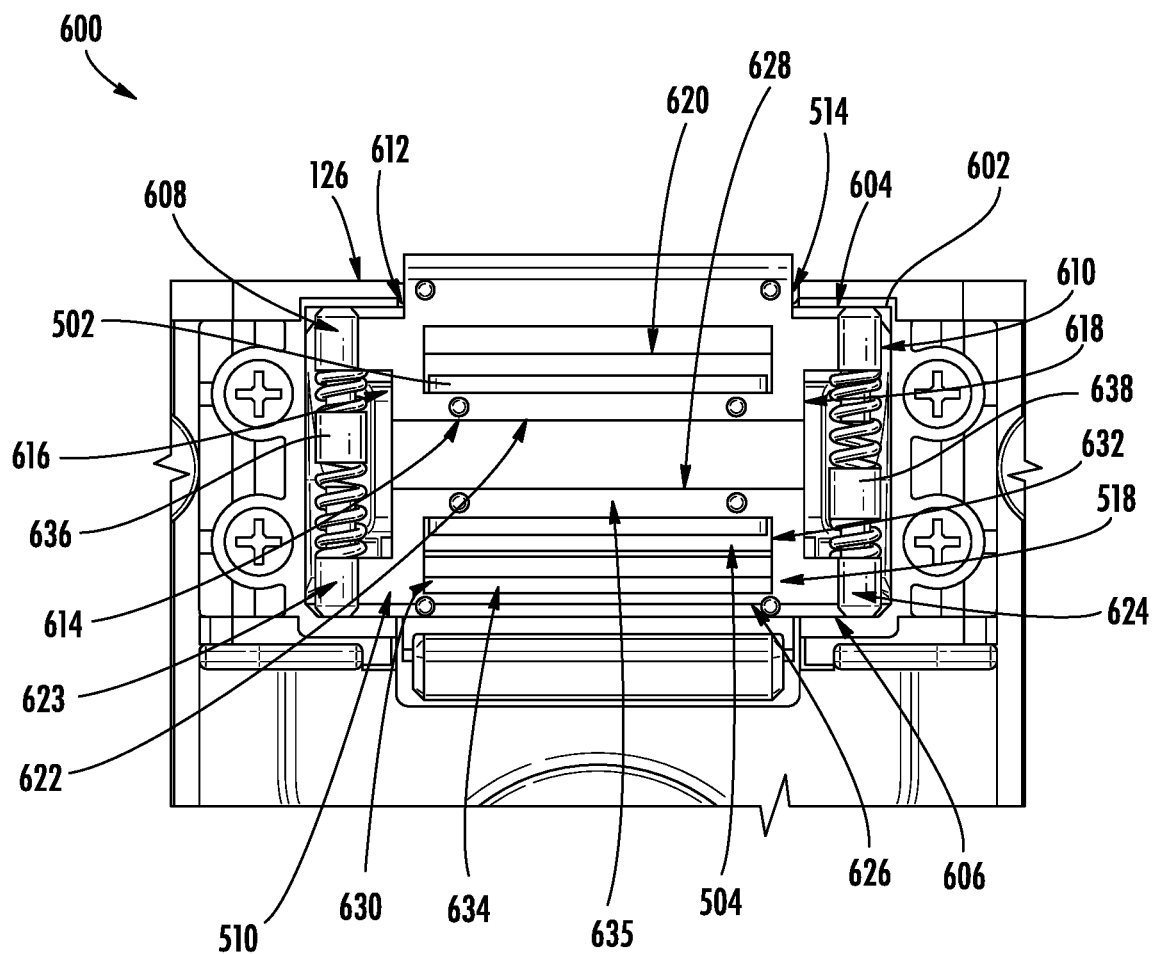
Figure 7:
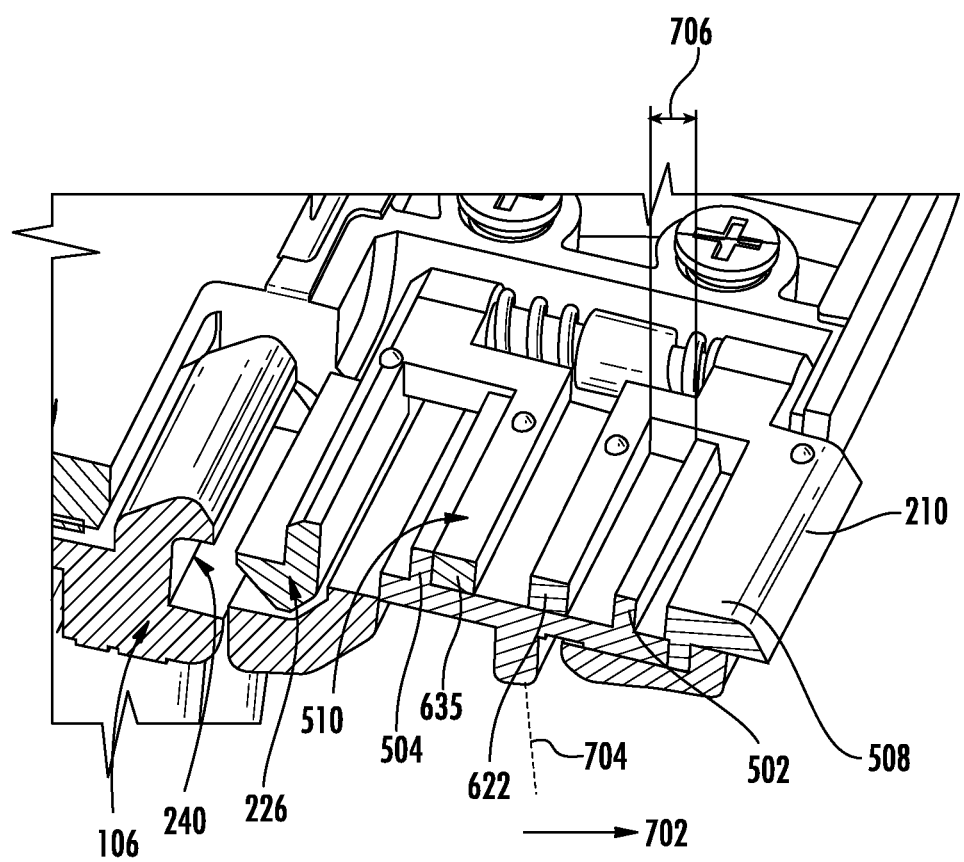
Figure 8:
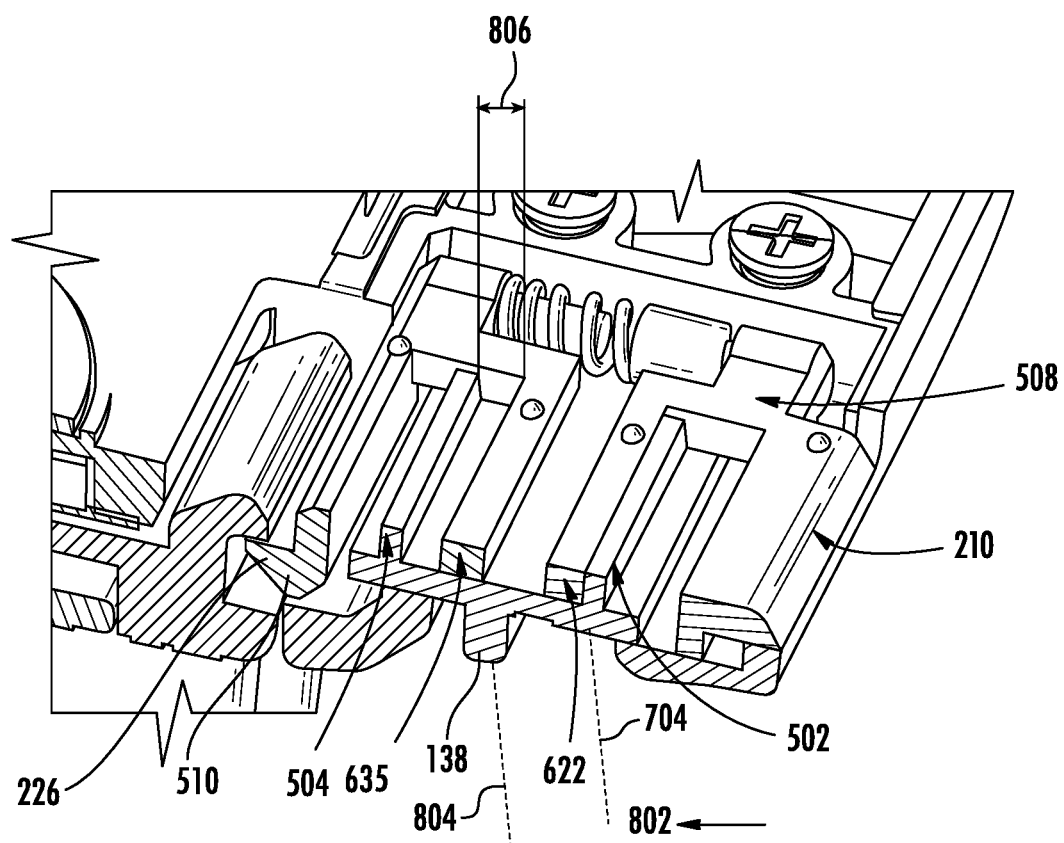
Figure 9A:
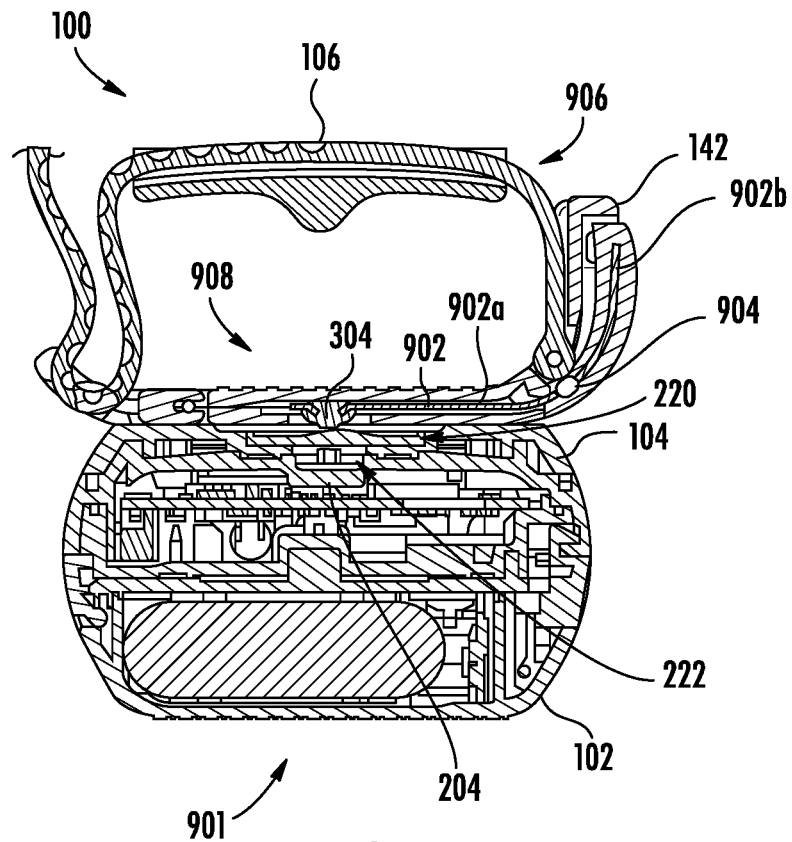
Figure 9B:
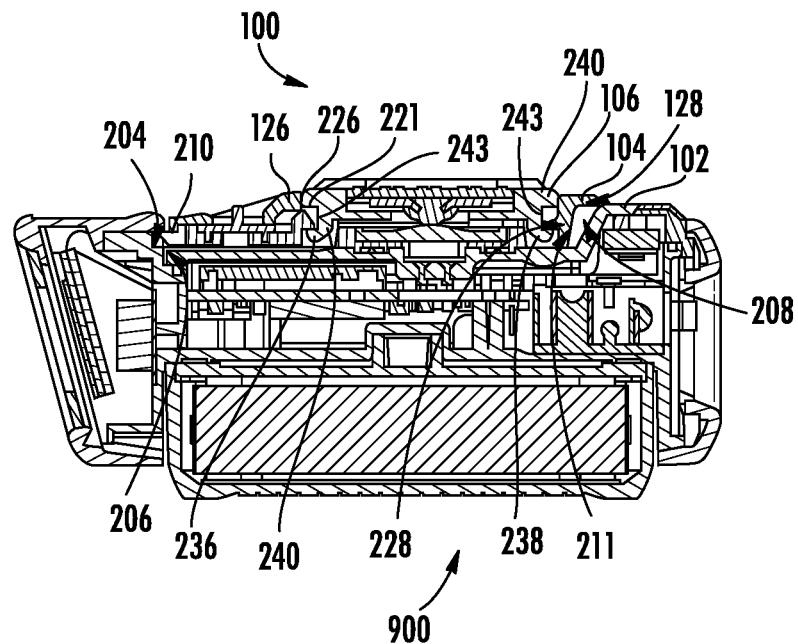
Figure 11:
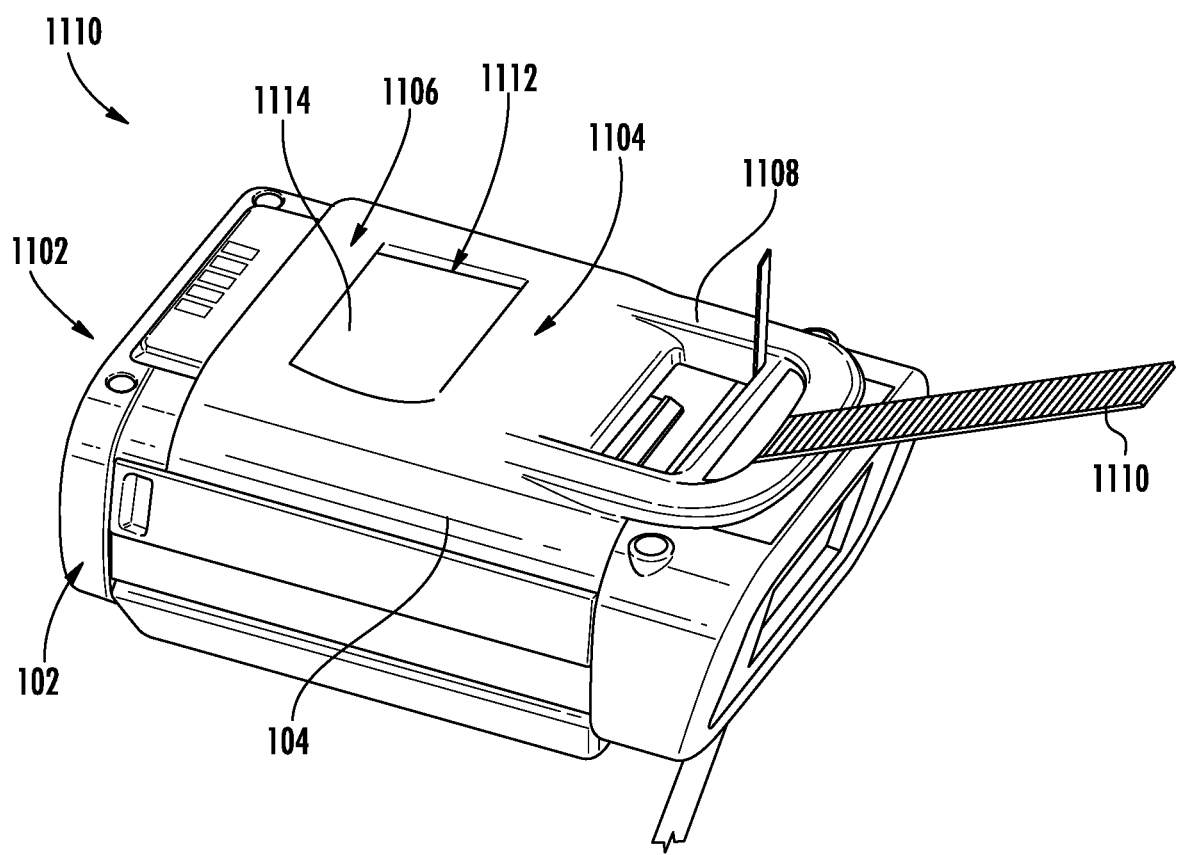
Figure 12:
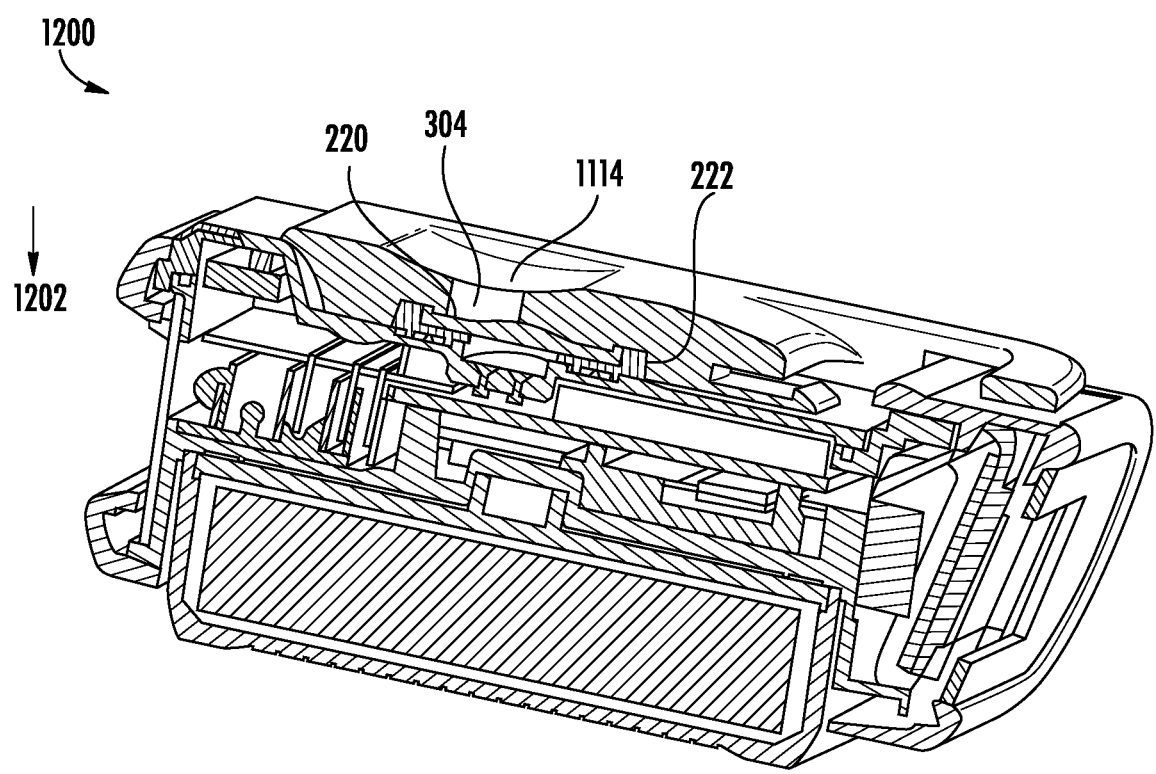
Figure 13A:
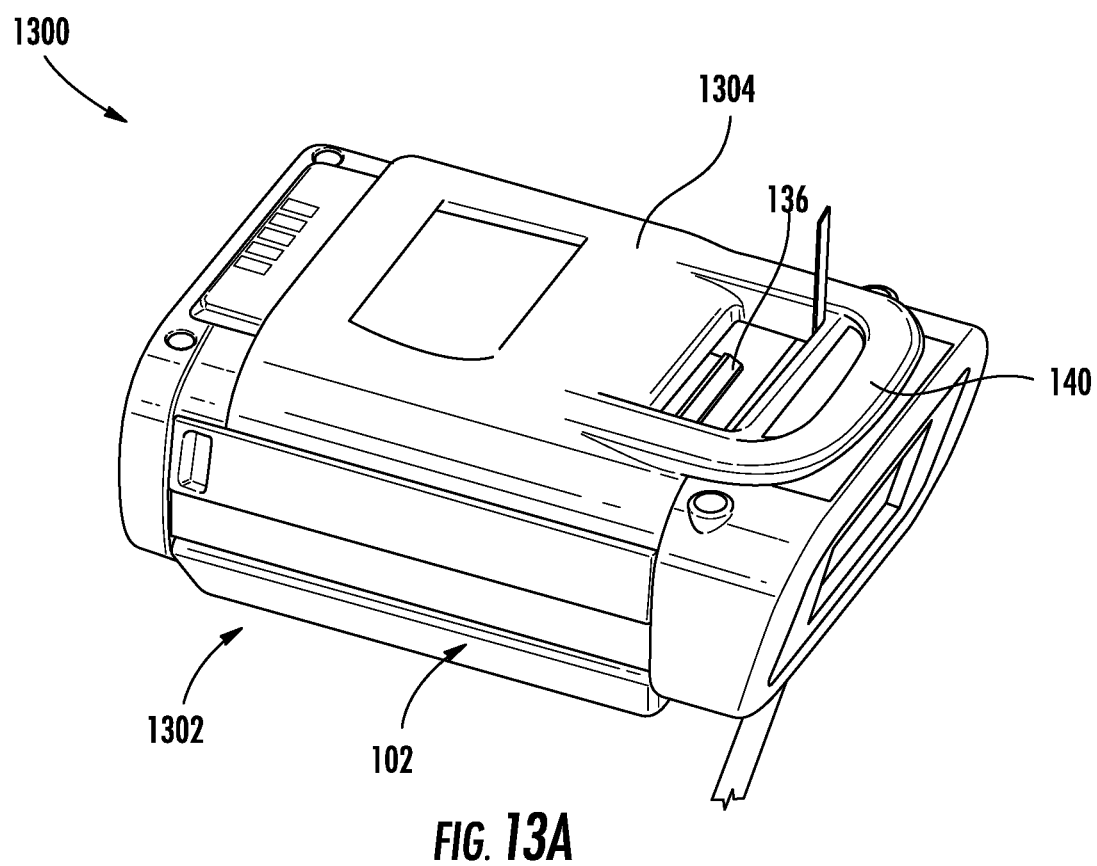
Figure 13B:
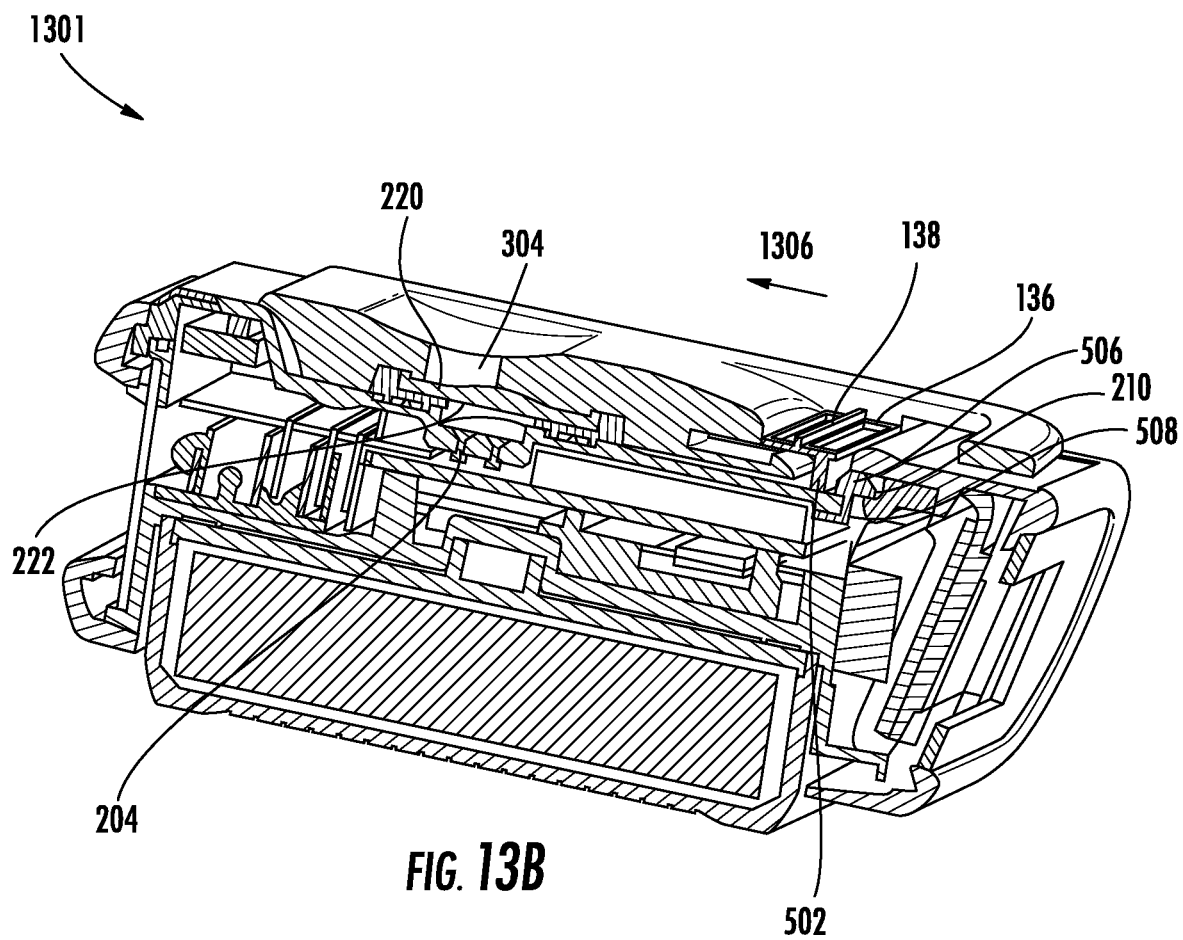
Figure 14:
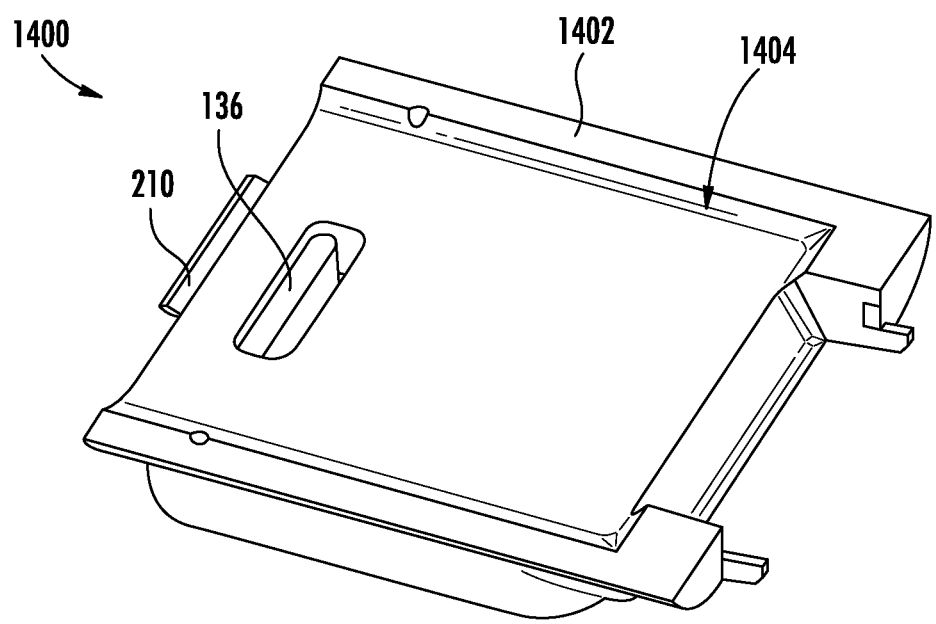
Figure 15:
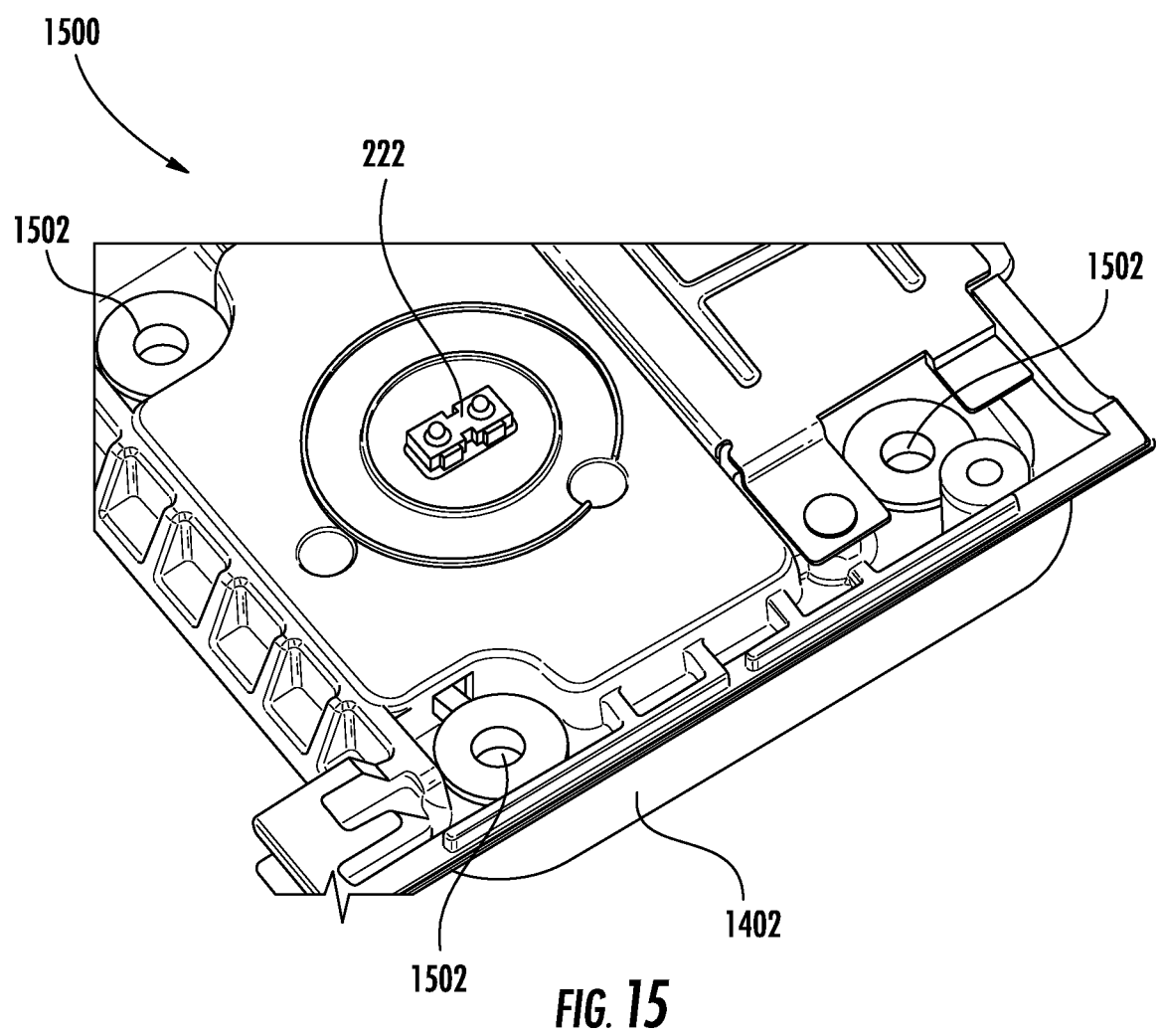
Figure 16A:
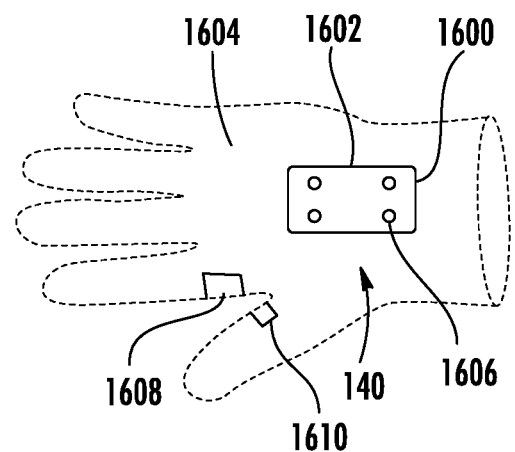
Figure 16B:
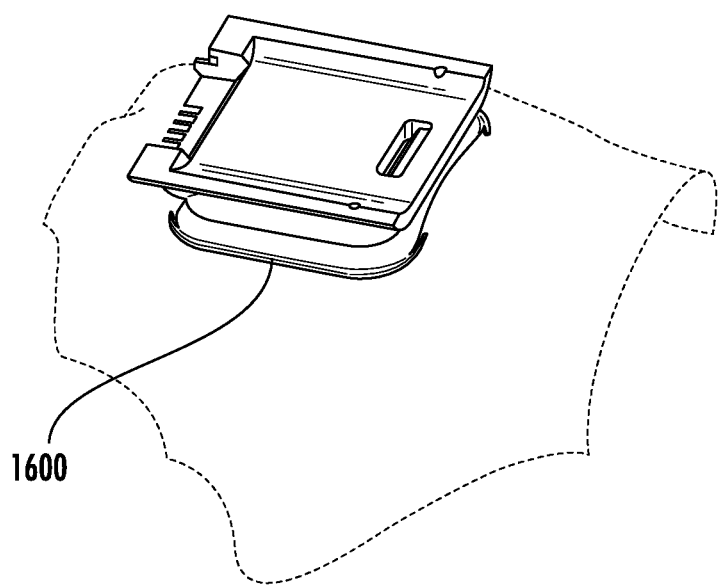

Having thus described embodiments of the invention in general terms, reference will now be made to the accompanying drawings, which are not necessarily drawn to scale, and wherein:

FIG. 1 illustrates an example assembly of a mobile scanning device, an adapter module, and an attachment member, in accordance with one or more embodiments of the present disclosure;

FIGS. 2A-2B illustrate exploded view of the assembly of a mobile scanning device, an adapter module, and an attachment member, in accordance with one or more embodiments of the present disclosure;

FIG. 3 illustrates another exploded view of the assembly of a mobile scanning device, an adapter module, and an attachment member, in accordance with one or more embodiments of the present disclosure;

FIG. 4 illustrates a top view of a portion of an adapter module, in accordance with one or more embodiments of the present disclosure;

FIG. 5 illustrates a sectional view of a portion of an adapter module, in accordance with one or more embodiments of the present disclosure;

FIG. 6 illustrates a bottom view of a portion of an adapter module, in accordance with one or more embodiments of the present disclosure;

FIG. 7 illustrates a portion of a sectional view of the assembly depicting a first position of a release switch of a latch mechanism, in accordance with the one or more embodiments of the present disclosure;

FIG. 8 illustrates a portion of a sectional view of the assembly depicting a second position of a release switch of a latch mechanism, in accordance with the one or more embodiments of the present disclosure;

FIGS. 9A and 9B illustrate a longitudinal sectional view and a transverse sectional view of an assembly of a mobile scanning device, an adapter module, and an attachment member, in accordance with the one or more embodiments of the present disclosure;

FIGS. 10A, 10B, and 10C illustrate various configurations of the attachment member with respect the adapter module, in accordance with the one or more embodiments of the present disclosure;

FIG. 11 illustrates a perspective view of an assembly of a mobile scanning device, an adapter module, and a lanyard type attachment member, in accordance with the one or more embodiments of the present disclosure;

FIG. 12 illustrates a sectional view of an assembly of a mobile scanning device, an adapter module, and a lanyard type attachment member, in accordance with the one or more embodiments of the present disclosure;

FIGS. 13A and 13B illustrate a perspective view and a sectional view of an assembly of a mobile scanning device and an integral component, in accordance with the one or more embodiments of the present disclosure;

FIG. 14 illustrates a perspective view of a second adapter module, in accordance with one or more embodiments of the present disclosure;

FIG. 15 illustrates a bottom view of a second adapter module, in accordance with one or more embodiments of the present disclosure; and FIGS. 16A and 16B illustrate the second attachment member, in accordance with one or more embodiments of the present disclosure.

DETAILED DESCRIPTION

In some example embodiments described herein, an adapter module is described. The adapter module is configured to engage an attachment member, such as a finger loop, a glove, a wrist strap, a helmet mount, a handle, a lanyard and/or the like, that can be secured on a body of a worker. Further, the adapter module is configured to engage a mobile scanning device configured to capture and decode indicia. In other examples, the mobile scanning device may take the form of a device configured for the capture of an image, such as for decoding, processing, storing and/or the like.

In some examples, the mobile scanning device may operate in an environment where rapid scanning actions are needed. In other examples, the mobile scanning device may operate in an environment where reduced scanning actions are needed and/or otherwise permitted. In some examples, such as when the mobile scanning device is to be used in the environment where reduced scanning actions are needed, the adapter module (engaged with the mobile scanning device) may be configured to engage with the attachment members that may not have a trigger mechanism. In such cases, the mobile scanning device may be configured to enter a mode where the mobile scanning device is triggered automatically and/or is triggered based on the mobile scanning device capturing or otherwise identifying a worker's gesture. In other examples, the mobile scanning device is to be used in environments where the reduced scanning actions are needed. The adapter module (engaged with the mobile scanning device) may be configured to engage with an attachment member that includes a trigger mechanism. In such an arrangement, the mobile scanning device is operated manually such that the mobile scanning device is triggered in response to a triggering action received on the attachment members from the worker (operating the mobile scanning device). Alternatively or additionally, the trigger mechanism may be configured to cause the mobile scanning device to enter a mode where the mobile scanning device is triggered automatically and/or is triggered based on a worker's gesture.

To enable the engagement of the adapter module with the mobile scanning device and the attachment member, the adapter module, in some examples, may include a latching mechanism that advantageously provides a dual switch design that reduces the height and form factor of the adapter module. In such embodiments, the latching mechanism may include a release switch configured to translate between a first position and a second position, and a latch body attached to the release switch configured to similarly translate between the first position and the second position. The latch body may define a first tongue section configured to engage a first receiving element of a first device (e.g., the mobile scanning device), and a second tongue section configured to engage a corresponding second receiving element of a second device (e.g., the attachment member) such as a finger loop, a glove, a wrist strap, a helmet mount, a handle, lanyard, or the like.

During operation, a user may apply an external force to the release switch in a first direction (e.g., shown in FIG. 7) such that the latch body translates in the first direction to the first position. In the first position, engagement between the second end of the latch body and the corresponding second receiving element of the second device (e.g., the attachment member) is precluded. In this way, the second device (e.g., attachment member) is removable from the adapter module. Furthermore, in the first position, engagement between the first tongue section of the latch body and the corresponding first receiving element of the mobile scanning device is maintained.

During operation, a user may apply an external force to the release switch in a second direction (e.g., shown in FIG. 8) such that the latch body translates in the second direction to the second position. In the second position, engagement between the first tongue section of the latch body and the corresponding first receiving element of the first device (e.g., the mobile scanning device) is precluded. In this way, the first device (e.g., the mobile scanning device) is removable from the adapter module. Furthermore, in the second position, engagement between the second tongue section of the latch body and the corresponding second receiving element of the second device (e.g., the attachment member) is maintained.

FIG. 1 illustrates an example assembly 100 of a mobile scanning device 102, an adapter module 104, and an attachment member 106, in accordance with one or more embodiments of the present disclosure.

In some examples herein, the mobile scanning device 102 takes the form of a bar code scanning device. Alternatively or additionally, the mobile scanning device 102 may correspond to other devices that are mountable on to a worker, such as a portable RFID reader, a printer, a voice recorder, and/or the like.

In an example embodiment, the mobile scanning device 102 has a first housing 108 with a first end portion 110, a second end portion 112, and a body portion 114. The body portion 114 extends between the first end portion 110 and the second end portion 112. In an example embodiment, the first end portion 110 defines a window 116 that is configured to receive an image capturing assembly 118. In an example embodiment, the image capturing assembly 118 may be configured to capture an image or scan an object. The image capturing assembly 118 may include an illumination assembly to illuminate a field of view of the imaging capturing assembly. The illumination assembly may, for example, include an illumination source, an illuminating optics assembly, such as one or more lenses, diffusers, wedges, reflectors or a combination of such elements, for directing light from illumination source in the direction of the field of view. For example, if the image of an object is to be captured, the illumination assembly may be configured to direct the light on the object. Some examples of the illumination source may include, for example, laser or light emitting diodes (LEDs) such as white LEDs or red LEDs. Further, the image capturing assembly 118 includes an imaging assembly that may further include an image sensor, such as a color or monochrome 1D or 2D CCD, CMOS, NMOS, PMOS, CID or CMD solid state image sensor, together with an imaging optics assembly for receiving and focusing an incident light (from the ambient) on the image sensor.

In some examples, the scope of the disclosure is not limited to the first end portion 110 defining the window 116 that is configured to receive the image capturing assembly 118. In some example embodiments, any other assembly may be received at the first end portion 110 depending on type of the mobile scanning device 102. For example, where the mobile scanning device 102 corresponds to an RFID reader, the first end portion 110 may be configured to receive an RF antenna that may be configured to receive RF signal from the RFID tags. Similarly, other applications may be contemplated.

In an example embodiment, the body portion 114 has a top surface 120, and a bottom surface 122 (described further below in conjunction with FIGS. 2A and 2B). In an example embodiment, the bottom surface 122 is configured to receive the adapter module 104.

In an example embodiment, the adapter module 104 has a second housing 124 that has first end portion 126, a second end portion 128, and a body portion 130. In an example embodiment, the first end portion 126 of the second housing 124 abuts the first end portion 110 of the first housing 108 of the mobile scanning device 102. Further, the second end portion 128 of the second housing 124 abuts the second end portion 112 of the first housing 108. The body portion 130 extends between the first end portion 126 and the second end portion 128.

In an example embodiment, the body portion 130 of the second housing 124 has a top surface 132 and a bottom surface 131. The top surface 132 defines a slit section 134 proximal to the first end portion 126 of the second housing 124. The slit section 134 is configured to movably receive a latching mechanism 136.

The latching mechanism 136 facilitates engagement of the adapter module 104 with the mobile scanning device 102, as is described later in conjunction with FIGS. 2A-8. The latching mechanism 136 includes a release switch 138 that may be utilized by the worker to move the latching mechanism 136 between a first position and a second position within the slit section 134, as is described later in conjunction with FIG. 7 and FIG. 8. In an example embodiment, the latching mechanism 136 is spring loaded, which enables the latching mechanism 136 to return to a default position (a position between the first position and the second position) from either the first position or the second position.

Further, the latching mechanism 136 also facilitates engagement of the adapter module 104 with the attachment member 106. The structure and operation of the latching mechanism 136 is described in conjunction with FIGS. 4-6.

In an example embodiment, the adapter module 104 is configured to receive the attachment member 106 on the top surface 132. In an example embodiment, the attachment member 106 includes a worker engagement member 140. In an example embodiment, the worker engagement member 140 may correspond to a component on the attachment member 106 that engages/interacts with a body of the worker so as to securely attach the assembly 100 to the body of the worker. Some examples of the worker engagement member 140 may include, but not limited to, a finger loop, a glove, a wrist strap, a helmet mount, a handle, a lanyard and/or the like. Some examples of the worker engagement member 140 have been illustrated and described later in conjunction with FIGS. 11-16.

In some embodiments, the attachment member 106 may further include a trigger mechanism 142 that allows the worker to provide an input to trigger the mobile scanning device 102. On receiving the trigger, the mobile scanning device 102 captures/scans the object. The operation and structural details of the trigger mechanism 142 has been described later in conjunction with FIG. 9, FIG. 11, and FIG. 16.

In some example embodiments, the attachment member 106 may not include a trigger mechanism 142. In such examples, the presence or absence of a trigger mechanism 142 is detected by the mobile scanning device 102 (such as based on a wired connection through the adapter module 104) or through a wireless connection (such as a Bluetooth connection). Alternatively or additionally, the worker may provide an input on the mobile scanning device 102 to indicate the presence or absence of the trigger mechanism 142.

FIG. 2A, FIG. 2B, and FIG. 3 illustrate exploded views 200 and 300 of the assembly 100 of the mobile scanning device 102, the adapter module 104, and the attachment member 106, in accordance with one or more embodiments of the present disclosure.

Referring to the exploded view 200, the bottom surface 122 of the first housing 108 of mobile scanning device 102 extends from the first end portion 110 to the second end portion 112 of the first housing 108. In an example embodiment, the bottom surface 122 defines a recess 202 in the body portion 114 that includes one or more electrical contacts 204. In an example embodiment, the one or more electrical contacts 204 is disposed on a PCB enclosed in the first housing 108. Further, in some examples, the one or more electrical contacts 204 are utilized to trigger the mobile scanning device 102.

In an example embodiment, the bottom surface 122 of the first housing 108 defined in the body portion 114 is at an offset from the bottom surface 122 defined in the first end portion 110 and the second end portion 112, therefore defining a step 206 and a step 208 connecting the bottom surface 122 of the body portion 114 with the bottom surface of the first end portion 110 and the second end portion 112, respectively. In an example embodiment, a first groove 209 and a second groove 211 are defined on steps 206 and 208, respectively. In an example embodiment, the first groove 209 and the second groove correspond to the first receiving element of the mobile scanning device 102.

In an example embodiment, the second end portion 128 of the second housing 124 of the adapter module 104 is configured to be received in the second groove 211 defined in step 208. Further, as can be observed, at the first end portion 126 of the second housing 124 of the adapter module 104, a first tongue section 210 protrudes out of the second housing 124. In an example embodiment, the first tongue section 210 corresponds to a component of the latching mechanism 136 that moves with respect the second housing 124 as a result of an application of force (in the direction 139) by the worker on the release switch 138. In an example embodiment, the first tongue section 210 may be received in the first groove 209 defined in the step 206 to engage the mobile scanning device 102 with the adapter module 104. In an example embodiment, it can be observed that upon engagement of the adapter module 104 with the mobile scanning device 102, the mobile scanning device 102 is received at the bottom surface 131 of the second housing 124.

Further, referring to the exploded view 200, the top surface 132 of the second housing 124 defines a pocket section 212 in the body portion 130 of the second housing 124. In an example embodiment, the pocket section 212 is shaped to correspond to a depression in the second housing 124 of the adapter module 104, such that walls 214 and 216 are defined. In an example embodiment, the wall 214 is proximal to the first end portion 126 of the second housing 124. Further, the wall 216 is proximal to the second end portion 128 of the second housing 124. In an example embodiment, the wall 214 and the wall 216 define a first rectangular wing section 215 and a second rectangular wing section 217, respectively. In an example embodiment, the first rectangular wing section 215 includes a first wall 219, a second wall 221, and a third wall 223. The first wall 219 and the third wall 223 are perpendicular to the second wall 221. Further, the second wall is proximal to the first end portion 126 of the second housing 124. The second rectangular wing section 217 is defined by the wall 216 and is opposite to the first rectangular wing section 215. Further, the second rectangular wing section 217 includes a first wall 225, a second wall 227, and a third wall 229. The first wall 225 and the third wall 229 are perpendicular to the second wall 227. Further, the second wall 227 is proximal to the second end portion 128.

In an example embodiment, a second tongue section 226 movably protrudes outwardly from the second wall 221 of the first rectangular wing section 215 (proximal to the first end portion 126). In an example embodiment, the second tongue section 226 corresponds to a component of the latching mechanism 136 that moves with respect the second housing 124 (for example, the wall 214) as a result of an application of force (in the direction 137) by the worker on the release switch 138. In an example embodiment, a protrusion 228 is defined on the second wall 227 in the second rectangular wing section 217.

In the pocket section 212, the top surface 132 defines a through hole 218 that is configured to movably receive a dome switch 220 and an electrical coupler 222 such that the electrical coupler 222 (refer exploded view 300) protrudes outwardly from the bottom surface 131 of the second housing 124, and the dome switch 220 protrude outwardly from the top surface 132. When the adapter module 104 engages with the first housing 108 of mobile scanning device 102, the electrical coupler 222 is received in the recess 202 defined in the first housing 108 such that in a default state (i.e., when no force is applied on the trigger mechanism 142) the electrical coupler 222 is not in contact with the one or more electrical contacts 204.

Referring to the exploded view 200, the attachment member 106 is receivable in the pocket section 212 of the adapter module 104. The attachment member 106 has a third housing 230 having a bottom surface 232, a top surface 234, a first edge surface 236, and a second edge surface 238. The first edge surface 236 and the second edge surface 238 extend along a longitudinal axis of the attachment member 106. Further, the first edge surface 236 and the second edge surface 238 abut with the walls 214 and 216 of the pocket section 212, respectively, when the attachment member 106 is received in the adapter module 104. Further, the first edge surface 236 and the second edge surface 238 define a second receiving element 240 that may correspond to a rectangular extension defined on the first edge surface 236 and the second edge surface 238. In an example embodiment, the rectangular extension (i.e., the second receiving element 240) allows the attachment member 106 to be received within the pocket section 212 such that the second receiving element 240 defined on both the first edge surface 236 and the second edge surface 238 is received within the in the first rectangular wing section 215 and the second rectangular wing section 217, respectively. Because the second receiving element 240 is received within the in the first rectangular wing section 215 and the second rectangular wing section 217, the lateral movement of the attachment member 106 is restricted.

In an example embodiment, the second receiving element 240 (defined on both the first edge surface and the second edge surface) has a wall surface 241 that abuts with the second wall 221 defined in the first rectangular wing section 215 and the second wall 227 defined in the second rectangular wing section 217, respectively, when the attachment member 106 is received within the pocket section 212.

In an example embodiment, the wall surface 241 defined on the second receiving element 240 defines a groove, a recess, a cavity, or any other type of depression (hereinafter referred to as the groove 243) that facilitates secured engagement of the attachment member 106 with the adapter module 104. When the attachment member 106 is to be received in the pocket section 212 of the adapter module 104, the groove 243 defined on the wall surface 241 of the second receiving element 240 (defined on the second edge surface 238) receives the protrusion 228. Thereafter, the second tongue section 226 is movably received in groove 243 defined on the wall surface of the second receiving element 240 (defined on the first edge surface 236), thereby securely engaging the attachment member 106 with the adapter module 104.

Because the lateral movement of the attachment member 106 is blocked (as the second receiving element 240 is received within the first rectangular wing section 215 and the second rectangular wing section 217) and the axial movement of the attachment member is blocked (by means of the reception of the groove 243 and the second tongue section 226 within the wall surface 241), the attachment member 106 is securely attached to the adapter module 104.

In an example embodiment, the worker engagement member 140 is coupled to the top surface 234 of the third housing 230 of the attachment member 106. Further, in the example embodiment, the trigger mechanism 142 is pivoted at the top surface 234 of the third housing 230. Further, the trigger mechanism 142 is positioned adjacent to the worker engagement member 140. In some example embodiments, the scope of the disclosure is not limited to having the trigger mechanism 142 as illustrated in FIG. 2A, FIG. 2B, and FIG. 3. In an example embodiment, other positioning of the trigger mechanism 142 may be contemplated (as is further described in FIGS. 11-12). In yet another embodiment, the attachment member 106 may not have any trigger mechanism.

Referring to the exploded view 300, the bottom surface 232 of the third housing 230 defines a cavity 302 that is configured to receive a push pin 304. In an example embodiment, the push pin 304 is mechanically coupled to the trigger mechanism 142 in such a manner that, when the input from worker is received to push the trigger mechanism 142, the push pin 304 moves in a direction 306. The relationship between the trigger mechanism 142 and the push pin 304 has been described later in conjunction with FIG. 9A and FIG. 9B.

In an example embodiment, the push pin 304 in the cavity 302 is positioned in such a manner that, when the attachment member 106 is received in the adapter module 104, the push pin 304 aligns with the dome switch 220 in the adapter module 104. When the worker pushes the trigger mechanism 142, the push pin 304 is moved in the direction 306 to push against the dome switch 220, which further pushes the electrical coupler 222. The electrical coupler 222 creates an electrical contact with the one or more electrical contacts 204 in the mobile scanning device 102. When the electrical coupler 222 creates the electrical contact with the one or more electrical contacts 204, the mobile scanning device 102 is triggered.

Having described the assembly 100 of the mobile scanning device 102, the adapter module 104, and the attachment member 106, the latching mechanism 136 included in the adapter module 104 will now be described.

FIG. 4, FIG. 5, and FIG. 6 include a top view 400, a sectional view 500, and a bottom view 600 of a portion of the adapter module 104, respectively, in accordance with one or more embodiments of the present disclosure.

The top view 400 of the portion of the adapter module 104 illustrates the first end portion 126 of the second housing 124, and a cut portion of the body portion 130. As discussed, the body portion 130 defines the slit section 134 proximal to the first end portion 126. The slit section 134 is configured to receive the latching mechanism 136. In an example embodiment, the release switch 138 of the latching mechanism 136 is receivable in the slit section 134 of the second housing 124, as illustrated in the top view 400 of the adapter module 104.

In an example embodiment, the release switch 138 (as illustrated in the top view 400) includes a base 402 and a handle section 404. The handle section 404 is positioned on the base 402 and extends outwardly from the base 402 (towards the top surface 132 of the second housing 124). In an example embodiment, the worker may apply force to the handle section 404 of the release switch 138 to move the release switch either in a first direction (depicted by 406) or in the second direction (depicted by 408) within the slit section 134.

Referring to the sectional view 500 of the portion of the adapter module 104, the release switch 138 includes a first leg portion 502, and a second leg portion 504 extending from the base 402 towards the bottom surface 131 of the second housing 124. The first leg portion 502 and the second leg portion 504 are coupled to a latch body 506 of the latching mechanism 136. In an example embodiment, the latch body 506 is positioned inside a cavity 602 (refer to FIG. 6) defined by the bottom surface of the second housing 124 proximal to the first end portion 126 of the second housing 124. In an example embodiment, the cavity 602 is defined in such a manner that the cavity 602 includes the slit section 134 (defined in the second housing 124). Therefore, the slit section 134 opens in the cavity 602 defined by the bottom surface of the second housing 124.

Referring to sectional view 500 and the bottom view 600 of the portion of the adapter module 104, the cavity 602 (that receives the latch body 506) has a first wall 604, positioned proximal to the first end portion 126, and a second wall 606 opposite to the first wall 604. In an example embodiment, the second wall 606 and the second wall 221 of the first rectangular wing section 215 of the pocket section 212 are common walls.

In an example embodiment, the latch body 506 includes a first body portion 508 and a second body portion 510. The first body portion 508 includes a base section 512 that further includes the first tongue section 210, a body section 514, a first arm section 608, and a second arm section 610. The first arm section 608 and the second arm section 610 are coupled to the body section 514 such that the second arm section 610 and the first arm section 608 are spaced apart and are opposite to each other. Further, each of the first arm section 608 and the second arm section 610 of the first body portion 508 abuts the first wall 604 of the cavity 602.

The body section 514 includes a first end 612, a second end 614, a first side portion 616, and a second side portion 618. The first end 612 is coupled to the first tongue section 210. Further, the first side portion 616 and the second side portion 618 are coupled to the first arm section 608 and the second arm section 610, respectively. In an example embodiment, the body section 514 defines a rectangular cut section 620 such that a rectangular cut side 622 is defined that is distal from the first tongue section 210 and is proximal to the second body portion 510. In an example embodiment, the first leg portion 502 of the release switch 138 is receivable in the rectangular cut section 620 defined in the first body portion 508.

Similar to the first body portion 508, the second body portion 510 also includes a base section 516 that further includes the second tongue section 226, a body section 518, a first arm section 623, and a second arm section 624. Additionally, the second body portion 510 includes a vertical extension 520. The first arm section 623 and the second arm section 624 are coupled to the body section 518 such that the second arm section 624 and the first arm section 623 are spaced apart and are opposite to each other. Further, each of the first arm section 623 and the second arm section 624 of the second body portion 510 abuts the second wall 606 of the cavity 602.

The body section 518 includes a first end 626, a second end 628, a first side portion 630, and a second side portion 632. The first end 626 is coupled to the vertical extension 520. The vertical extension 520 is further coupled to the second tongue section 226. Therefore, the vertical extension 520 couples the second tongue section 226 with the first end 626 of the body section 518. Because the second tongue section 226 is coupled to the second body portion 510 through the vertical extension 520, the second tongue section 226 is at a vertical offset (depicted by 522) from the first tongue section 210.

Further, the first side portion 630 and the second side portion 632 are coupled to the first arm section 623 and the second arm section 624, respectively. In an example embodiment, the body section 518 defines a rectangular cut section 634 such that a rectangular cut side 635 is distal from the second tongue section 226 and is proximal to the first body portion 508. In an example embodiment, the second leg portion 504 of the release switch 138 is receivable in the rectangular cut section 634 defined in the second body portion 510.

In an example embodiment, the first body portion 508 is coupled to the second body portion 510 through a first biasing member 636 and a second biasing member 638. More specifically, the first biasing member 636 couples the first arm section 608 of the first body portion 508 with the first arm section 623 of the second body portion 510. Similarly, the second biasing member 638 couples the second arm section 610 of the first body portion 508 with the second arm section 624 of the second body portion 510. In an example embodiment, the first biasing member 636 and the second biasing member 638 may correspond to a spring.

In an example embodiment, when no external force is applied on the release switch 138, the first biasing member 636 and the second biasing member 638 restrict the movement of the first body portion 508, the second body portion 510 and the release switch 138. Further, the first biasing member 636 and the second biasing member 638 facilitate positioning the release switch 138 in the default position. In an example embodiment, in the default position, the first leg portion 502 and the second let portion 504 of the release switch 138 abut the rectangular cut side 622 in the first body portion 508 and the rectangular cut side 635 in the second body portion 510, respectively. The operation of the release switch are described later in conjunction FIGS. 7 and 8.

Referring to the first tongue section 210 (coupled to the first body portion 508), the first tongue section 210 (as discussed above extends outwardly from the first end portion 126 the second housing 124) includes a chamfer surface 524. Similarly, the second tongue section 226 (as discussed above extends outwardly from the wall 214) include a chamfer surface 526.

FIG. 7 and FIG. 8 illustrate a portion of a sectional view of the assembly 100 depicting the first position and the second position of the release switch 138, respectively, in accordance with the one or more embodiments of the present disclosure.

Specifically, FIG. 7 illustrates the release switch 138 having a force applied in a first direction 702. In an example embodiment, on application of the force in the first direction, the release switch 138 moves towards the first end portion 126 of the second housing 124 of the adapter module 104 (i.e., the first position 704). This causes the second leg portion 504 of the release switch 138 to engage with the rectangular cut side 635 of the second body portion 510, which may further cause the second body portion 510 to move in the first direction 702. As the second body portion 510 moves in the first direction 702, the second tongue section 226 disengages from the second receiving element 240, thereby disengaging the attachment member 106. It may be noted that, during the movement of the release switch 138 towards the first position, the first leg portion 502 of the release switch 138 moves away from the rectangular cut side 622 (i.e., the first leg portion 502 does not abuts the rectangular cut side 622), thereby creating a space 706 between the first leg portion 502 and the rectangular cut side 622. Therefore, the movement of the release switch 138 in the first direction 702 does not affect the position of the first body portion 508. Hence, the first tongue section 210 of the first body portion 508 remains engaged with the mobile scanning device 102 while the second tongue section 226 disengages the attachment member 106.

FIG. 8 illustrates the release switch 138 having a force applied in a second direction (depicted by 802). In an example embodiment, on application of the force in the second direction 802, the release switch 138 moves towards the second end portion 128 of the second housing 124 of the adapter module 104 (i.e., the second position 804). This causes the first leg portion 502 of the release switch 138 to engage with the rectangular cut side 622 of the first body portion 508, which may further cause the first body portion 508 to move in the second direction 802. As the first body portion 508 moves in the second direction 802, the first tongue section 210 disengages from the first groove 209 defined on the mobile scanning device 102, thereby disengaging the mobile scanning device 102. It may be noted that, during the movement of the release switch 138 towards the second position 804, the second leg portion 504 of the release switch 138 moves away from the rectangular cut side 635 (i.e., the second leg portion 504 does not abut the rectangular cut side 634), thereby creating a space 806 between the second leg portion 504 and the rectangular cut side 634. Therefore, the movement of the release switch 138 in the second direction 802 does not affect the position of the second body portion 510. Hence, the second tongue section 226 of the second body portion 510 remains engaged with the attachment member 106 while the first tongue section 210 disengages the mobile scanning device 102.

FIG. 9A and FIG. 9B illustrate a transverse sectional view 901 and a longitudinal sectional view 900 of the assembly 100 of the mobile scanning device 102, the adapter module 104, and the attachment member 106.

From the longitudinal sectional view 900, it can be observed that the second end portion 128 of the second housing 124 is received in the second groove 211 defined on the step 208. Further, the first tongue section 210 extending outward from the second housing 124 is received in the first groove 209 defined on the step 206. The engagement of the first tongue section 210 with the first groove 209 and the engagement of the second end portion 128 with the second groove 211 securely engages the adapter module 104 with the mobile scanning device 102.

The second tongue section 226 extending out from the second wall 221 (in the first rectangular wing section 215) is engaged with the groove 243 defined on the second receiving element 240 (defined on the first edge surface 236) of the attachment member 106. Further, the groove 243 defined on the second receiving element 240 (defined on the second edge surface 238) may engage with the protrusion 228, thereby securely engaging the attachment member 106 to the adapter module 104.

The second receiving element 240 is defined on both the edge surfaces (i.e., the first edge surface 236 and the second edge surface 238), therefore either of the two second receiving element 240 may receive the second tongue section 226. For example, the second tongue section 226 extending out from the second wall 221 may be engaged with the groove 243 defined on the second receiving element 240 (defined on the second edge surface 238) of the attachment member 106. Further, the groove 243 defined on the second receiving element 240 (defined on the first edge surface 236) may engage with the protrusion 228. Therefore, such structure of the attachment member 106 allows configuring the attachment member 106 (with respect to the adapter module 104) so that the assembly 100 may be utilized by both left-handed worker and the right-handed worker.

FIG. 10A, FIG. 10B, and FIG. 10C illustrate various configurations of the attachment member 106 with respect the adapter module 104, in accordance with the one or more embodiments of the present disclosure.

To alter the configuration of the attachment member 106 in the assembly 100, the release switch is moved in the direction 702 to disengage the second tongue section 226 from the groove 243 defined on the second receiving element 240 (in the first edge surface 236). On disengagement, the attachment member 106 can be removed from the adapter module 104 (as depicted by 1002). Further, the attachment member 106 is rotated such that the groove 243 defined on the second receiving element 240 (in the second edge surface 238) is positioned proximal to the second tongue section 226 (depicted by 1004). Thereafter, the attachment member 106 is engaged with the adapter module 104, as is described above. In some examples, this allows the attachment member 106 to be configured to allow the assembly 100 to be used by the left handed worker and/or the right handed worker.

Referring back to FIG. 9A, in an example embodiment, it can be observed from the transverse sectional view 901 that, when the mobile scanning device 102, the adapter module 104, and the attachment member 106 are securely engaged with each other, the push pin 304 aligns with the dome switch 220 and the electrical coupler 222. Further, the electrical coupler 222 aligns with the one or more electrical contacts 204.

In an example embodiment, the push pin 304 is coupled to the trigger mechanism 142 through a plate 902. In an example embodiment, the plate 902 may correspond to an L-shaped plate that is pivoted at a junction 904 between the top surface 234 of the attachment member 106 and the trigger mechanism 142. Further, a portion of the plate 902 extends along the length of the trigger mechanism 142 (depicted by 902b). A portion of the plate 902 extending between the push pin 304 and the junction 904 is hereinafter referred to as the plate 902a. When the trigger mechanism 142 (having the plate 902b) is pressed, the plate 902b moves in a lateral direction (depicted by the direction 906). The lateral movement of the plate 902b translates into vertical movement of the plate 902a (in the direction 908), because the plate 902 is pivoted as the junction 904. Further, the movement of the plate 902b in the direction 908 causes the push pin 304 (coupled to the plate 902a) to move in the direction 908, which causes the push pin 304 to push the dome switch 220 (in the adapter module 104) that in turn pushes the electrical coupler 222 (in the adapter module 104). When the electrical coupler 222 is pushed (by the dome switch 220), the electrical coupler 222 touches the one or more electrical contacts 204, thereby triggering the mobile scanning device 102. On release of the trigger mechanism 142, the push pin retracts and therefore the force being exerted on the dome switch 220 is released. As the force being exerted on the dome switch 220 is released, the dome switch 220 also retracts, causing the electrical coupler 222 to retract and breaking the electrical connection between the electrical coupler 222 and the one or more electrical contacts 204. Therefore, the trigger condition is released.

The structure of the adapter module 104 disclosed in the aforementioned embodiments allows various types of attachment member 106 to be engaged with the adapter module 104. In some example embodiments, as illustrated in FIGS. 1 through 10C, the attachment member 106 (engaged with the adapter module 104) includes the worker engagement member 140, as the finger strap, and the trigger mechanism 142 being pivotally attached to the top surface 234 of the attachment member 106. Alternatively, the attachment member 106 may include other types of worker engagement member 140 (for example, a lanyard), as illustrated in FIGS. 11-13. Further, the positioning of the trigger mechanism 142 may also differ.

FIG. 11 and FIG. 12 illustrate a perspective view 1100 and a sectional view 1200, respectively, of an assembly 1102 of the mobile scanning device 102, the adapter module 104, and a lanyard type attachment member 1104. In an example embodiment, the lanyard type attachment member 1104 engages with the adapter module 104 in a similar manner as the attachment member 106 engages with the adapter module 104. A top surface 1106 of the lanyard type attachment member 1104 defines a hook 1108. In an example embodiment, the hook 1108 is configured to receive a lanyard 1110 that may be configured to be worn by the worker. Further, the top surface 1106 defines a through hole 1112 that is configured to receive a push button 1114. Referring to the sectional view 1200 of the assembly 1102, it can be observed that the push button 1114 is coupled to the push pin 304.

When the worker applies force on the push button 1114, the push pin 304 moves in a direction 1202, which causes the push pin 304 to push the dome switch 220 (in the adapter module 104) that in turn pushes the electrical coupler 222 (in the adapter module 104). When the electrical coupler 222 is pushed (by the dome switch 220), the electrical coupler 222 touches the one or more electrical contacts 204, thereby triggering the mobile scanning device 102.

In some example embodiments, the adapter module 104 and the attachment member 106 may be constituted in a single housing such that the adapter module 104 and attachment member 106 form an integral component. Such configuration has been illustrated in FIG. 13A and FIG. 13B.

FIG. 13A and FIG. 13B illustrate a perspective view 1300 and a sectional view 1301 of an assembly 1302 of the mobile scanning device 102 and the integral component 1304.

Referring to the perspective view 1300, the integral component 1304 is engaged with the mobile scanning device 102. Further, the integral component 1304 has the latching mechanism 136. Because the integral component 1304 does not have the provision of receiving the attachment member 106, the latching mechanism 136 may be configured to move in one direction (on application of external force) to disengage the integral component from the mobile scanning device 102. As depicted in the perspective view 1300, the integral component 1304 has a lanyard type of worker engagement member 140. However, other types of worker engagement member 140 (for example, the gloves, finger strap) may be contemplated.

Referring to the sectional view 1301, it can be observed that the release switch 138 of the latching mechanism 136 has only the first leg portion 502, which is coupled to the latch body 506. Further, it can be observed that the latch body 506 also have only the first body portion 508 that has the first tongue section 210. In an embodiment, the second tongue section 226 and the second body portion 510 may not be required as there is no need for removing the attachment member 106 (since the attachment member 106 and the adapter module 104 constitute the integral component 1304). Because the latching mechanism 136 (as illustrated in the assembly 1302) includes only the first body portion 508, the release switch 138 may be operable to move only in one direction to disengage the integral component 1304 from the mobile scanning device 102. For instance, the release switch 138 may move in the direction 1306 to the second position to disengage the mobile scanning device 102 from the integral component 1304.

Further, referring to the sectional view 1301 of the assembly 1302, it can be observed that the push pin 304, the dome switch 220 and the electrical coupler 222 are included in the integral component 1304. Further, it can be observed that the push pin 304 is coupled to the trigger mechanism such that when the trigger mechanism is pressed, the trigger mechanism pushes the push pin 304, which in turn pushes the dome switch 220. This further causes the dome switch 220 to push the electrical coupler 222 in the direction 1306, causing the electrical coupler 222 to touch the one or more electrical contacts 204 on the mobile scanning device and triggering the mobile scanning device 102.

In some example embodiments, the scope of the disclosure is not limited to having the adapter module 104 that engages with the attachment member 106 based on engagement of the second tongue section 226 with the second receiving element 240. In alternate embodiment, the attachment member 106 may be engaged with the adapter module 104 using other engagement means, such as those described in conjunction with FIGS. 14-16.

FIG. 14, and FIG. 15 illustrate a perspective view 1400 and a bottom view 1500 of second adapter module 1402, respectively, in accordance with one or more embodiments of the present disclosure.

Referring to the perspective view 1400, the second adapter module 1402 includes the latching mechanism 136 that further includes the first tongue section 210 protruding out from a second housing 1404 of the second adapter module 1402. Referring to the bottom view 1500, the second adapter module 1402 includes the electrical coupler 222. Further, the second adapter module 1402 includes one or more snap-fit buttons 1502. In an example embodiment, the one or more snap-fit buttons 1502 are configured to receive a second attachment member 1600 (refer FIG. 16).

FIG. 16A and FIG. 16B illustrate the second attachment member 1600, in accordance with one or more embodiments of the present disclosure. In an example embodiment, the second attachment member 1600 includes a base plate 1602 that is coupled to the worker engagement member 140, for example the glove 1604. The base plate 1602 includes one or more snap-fit buttons 1606 that are receivable in the one or more snap-fit buttons 1502 on the second adapter module 1402.

Because the second attachment member 1600 gets attached to the second adapter module 1402 through the one or more snap-fit buttons 1502 and 1606, the latching mechanism 136 is movable in only one direction, as described in FIG. 12 and FIG. 13. Further, the latching mechanism 136 is configured to detach the second adapter module 1402 from the mobile scanning device 102.

In an example embodiment, when the second adapter module 1402 engages with the mobile scanning device 102, the electrical coupler 222 (in the second adapter module 1402) is in direct contact with the one or more electrical contacts 204 in the mobile scanning device 102. Further, the electrical coupler 222 are electrical coupled to one or more electrical pads (1608 and 1610) positioned on the gloves 1604. When the worker touches the electrical pad 1608 with the electrical pad 1610, an electrical signal is generated and transmitted to the one or more electrical contacts 204 through the electrical coupler 222. On receiving the electrical signal from the one or more electrical contacts 204, the mobile scanning device 102 is triggered.

It is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A latching mechanism, comprising:
   a release switch configured to translate between a first position and a second position; and
   a latch body attached to the release switch and configured to translate between the first position and the second position, wherein the latch body comprises a first tongue section and a second tongue section;
   wherein in an instance in which the release switch receives an external force in a first direction, the latch body translates in the first direction to the first position such that: engagement between the second tongue section and a corresponding second receiving element of a second device is disengaged; the second device is removable from the latching mechanism; and engagement between the first tongue section and a corresponding first receiving element of a first device is maintained.

2. The latching mechanism of claim 1, wherein in an instance in which the release switch receives an external force in a second direction, the latch body translates in the second direction to the second position such that: engagement between the first tongue section and the corresponding first receiving element is disengaged; the first device is removable from the latching mechanism; and engagement between the second tongue section and the corresponding second receiving element is maintained.

3. The latching mechanism according to claim 1, wherein the release switch is configured to rest in a default position, wherein the default position corresponds to a location between the first position and the second position in which the first tongue section engages the corresponding first receiving element and the second tongue section engages the corresponding second receiving element to secure the first device to the second device.

4. The latching mechanism according to claim 3, further comprising a biasing member configured to position the release switch and the attached latch body to the default position.

5. The latching mechanism according to claim 4, wherein the biasing member is a spring.

6. The latching mechanism according to claim 1, wherein the first device is a mobile scanning device.

7. The latching mechanism according to claim 1, wherein the second device is an attachment member configured to be secured to a user.

8. The latching mechanism according to claim 1, wherein the release switch comprises a first leg portion and a second leg portion.

9. The latching mechanism according to claim 8, wherein the first leg portion and the second leg portion are coupled to the latch body.

10. The latching mechanism according to claim 9, wherein the latch body is positioned within a cavity.

11. An adapter module comprising:
    a housing, comprising:
      a bottom surface configured to receive a mobile scanning device; and
      a top surface side configured to receive an attachment member;
    a latching mechanism attached to the housing, the latching mechanism comprising:
      a release switch configured to translate between a first position and a second position;
      a latch body attached to the release switch and configured to translate between the first position and the second position, wherein the latch body comprises:

a first tongue section configured to engage a corresponding first receiving element of the mobile scanning device; and a second tongue section configured to engage a corresponding second receiving element of the attachment member, wherein in an instance in which the release switch receives an external force in a first direction, the latch body translates in the first direction to the first position such that: engagement between the second tongue section and the corresponding second receiving element is disengaged; the attachment member is removable from the latching mechanism; and engagement between the first tongue section and the corresponding first receiving element of the mobile scanning device is maintained.

12. The adapter module according to claim 11, wherein in an instance in which the release switch receives an external force in a second direction, the latch body translates in the second direction to the second position such that: engagement between the first tongue section and the corresponding first receiving element is disengaged; the mobile scanning device is removable from the latching mechanism; and engagement between the second tongue section and the corresponding second receiving element of the attachment member is maintained.

13. The adapter module according to claim 11, wherein the release switch is configured to rest in a default position, wherein the default position corresponds to a location between the first position and the second position in which the first tongue section engages the corresponding first receiving element and the second tongue section engages the corresponding second receiving element to secure the mobile scanning device to the attachment member.

14. The adapter module according to claim 13, further comprising a biasing member configured to position the release switch and the attached latch body to the default position.

15. The adapter module according to claim 14, wherein the biasing member is a spring.

16. The adapter module according to claim 11, wherein the release switch comprises a first leg portion and a second leg portion.

17. The adapter module according to claim 16, wherein the first leg portion and the second leg portion are coupled to the latch body.

18. The adapter module according to claim 17, wherein the latch body is positioned within a cavity.

19. The adapter module according to claim 11, wherein the attachment member is one of a finger loop, a glove, a wrist strap, a helmet mount, a handle, or a lanyard.

20. The adapter module according to claim 11, wherein the mobile scanning device is one of a bar code scanning device, a portable RFID reader, a printer, or a voice recorder.

* * * * *